US006760310B1

(12) United States Patent
Sofman

(10) Patent No.: US 6,760,310 B1
(45) Date of Patent: Jul. 6, 2004

(54) OPTIMAL ALLOCATION OF MULTI-SERVICE CONCENTRATORS

(75) Inventor: Lev B. Sofman, Plano, TX (US)

(73) Assignee: WorldCom, Inc., Ashburn, VA (US)

(*) Notice: Subject to any disclaimer, the term of this patent is extended or adjusted under 35 U.S.C. 154(b) by 0 days.

(21) Appl. No.: 09/315,271

(22) Filed: May 20, 1999

(51) Int. Cl.[7] .............................................. H04L 12/26
(52) U.S. Cl. ...................................... 370/238; 370/252
(58) Field of Search ............................. 379/114.03, 112; 370/229, 230, 231, 232, 235, 237, 238, 238.1, 252, 253, 254, 255, 365, 463

(56) References Cited

U.S. PATENT DOCUMENTS

| | | | | |
|---|---|---|---|---|
| 5,841,758 A | * | 11/1998 | Chen et al. .................. | 370/238 |
| 5,970,050 A | * | 10/1999 | Johnson ....................... | 370/238 |
| 6,141,318 A | * | 10/2000 | Miyao ......................... | 370/217 |
| 6,151,305 A | * | 11/2000 | Chen ........................... | 370/238 |
| 6,275,472 B1 | * | 8/2001 | Yamaguchi et al. ......... | 370/252 |
| 6,470,018 B1 | * | 10/2002 | Wiley et al. ................. | 370/396 |

* cited by examiner

*Primary Examiner*—Dang Ton
*Assistant Examiner*—Phuc Tran

(57) ABSTRACT

This is a system and method for optimally allocating multi-service traffic concentrators in telecommunications network. A problem model representing the telecommunications network topology is formulated and input to a linear programming algorithm for an optimal solution. In the model, data set indices are defined as those components and/or factors in the telecommunications network which affect various operations of the network, and include origination, concentration, and destination sites as well as different multiplexer levels at each of the sites. Decision variables representing measure of efficiency in the network and whose optimal values are to be computed by the linear program are defined to include concentrator node selection, concentrator to destination site connection status, and the number of optical carrier trunks for each concentrator. The values for each of the three variables provide the equipment quantity for optimally allocating multi-service traffic concentrators. The objective function to be minimized is defined as minimum of the sum of total transmission cost between selected origination sites and selected concentration sites, total transmission cost between selected concentration sites and selected destination sites, total unit cost of concentrators, total port cost on the low side of the concentrators, and total optical carrier level port cost on the high side of the concentrators and the destination switches.

28 Claims, 5 Drawing Sheets

OPTIMAL ALLOCATION OF MULTI-SERVICE CONCENTRATORS

FIELD OF THE INVENTION

The present invention relates to optimization methods and more particularly, to a system and method for optimizing allocation of multi-service traffic concentrators in a telecommunications network by employing linear programming.

BACKGROUND OF THE INVENTION

A typical telecommunications network includes, transmission components, switching components and facilities for maintaining equipment. Transmission components or links are the media used to transmit signals. Switching components or nodes include transmitters and receivers for voice and data and routers for routing using circuit-switching techniques. The transmission components in the local loop are largely made of copper twisted-pair wiring with the long distance service providers, i.e., the interexchange carriers providing services between local carriers, generally employ fiber-optic cables and radio systems for their backbone trunks and long distance lines. In such a communication network, it is highly desirable to allocate the transmission and switching components optimally such that every component in the network is utilized to its maximum capacity. Furthermore, in order to automate such an optimization procedure, it is also highly desirable to implement a solution that employs a mathematical technique such as linear programming.

Linear programming is generally concerned with the maximization or minimization of a linear object function having many variable terms subject to linear equality and inequality constraints. In its application, linear programming provides the ability to state general objectives or goals and to find optimal policy solutions, i.e., to determine detailed decisions to be taken in order to "best" achieve these goals when faced with practical situations or decision problems of great complexity. An example of an objective may be to minimize total costs or maximize profits measured in monetary units. In other applications, the objective may be to minimize direct labor costs or to maximize the number of assembled parts.

In its implementation, linear programming encompasses models that formulate real word problems in detailed mathematical terms, the algorithm that solve the models and the software that executes the algorithm on computers based on the mathematical theory. Commercial software is presently available for solving linear problems implemented with known mathematical theory, such as the universally known Simplex Method. However, before the software may be used to compute a solution using various mathematical algorithm, a mathematical model representing the real world problem must be built and programmed as an input to the existing software.

Building the mathematical model which represents a specific objective desired in a specific situation or practical application in the real world is frequently referred to as the model formulation or the problem formulation. Although general algorithm for solving linear problems are well known, the formulation of the linear problem is unique to each situation involving various decision making processes and requires an exact artistry to procure the most efficient solution possible. Models of the real world are not always easy to formulate because of the diversity and ambiguity that exists in the real world or because of the ambiguous understanding of it. For instance, linear problem models can be very large in practice, some having many thousands of constraints and variables. Yet, it is possible to abstract a real world problem and formulate it as a collection of mathematical relationships which characterize the set of feasible solutions to that problem. Consequently, it is well known in the field of mathematics that the process of the initial problem formulation is considered an essential and important aspect equally as solving it and merits a field of technological art in itself. Thus, in linear problem programming, it is highly desirable to define and formulate a linear problem well and suited to each unique situation, such that the most optimal solution may be obtained.

Formulating linear problems involves defining decision variables which represent the quantity to be controlled for optimal efficiency, defining item sets or data sets, and setting up constraints and objective functions. Item sets represent the classes or objects that are required as inputs or outputs in a system. Constraints refer to set of rules to which the solution must conform, and the objective function defines the goal desired in a practical application expressed in terms of a mathematical equation. Although there is more than one way to formulate a known problem, only a correct formulation will result in a correct solution. Moreover, the number of decision variables and constraints defined dictates whether or not a correct solution by linear programming can be attained quickly and efficiently. For example, depending on how well the problem is formulated and defined, a linear problem program can take from hours to days to execute before determining a solution. Thus, in linear programming it is also highly desirable to formulate a given problem in a most efficient manner such that a solution may be obtained quickly and efficiently.

In a typical network layout or design, it is always highly desirable to be able to minimize the cost of networking by allocating network circuit equipment including the communication servers, nodes, devices, lines and trunks in a most optimal manner, thereby balancing the available resources such that any unused surplus is utilized and a shortage of resources is avoided. Advantageously, and as described above with reference to linear programming, such network optimization problem provides an ideal application for solution by linear programming. Therefore, it is highly desirable to find an optimal allocation of communication components in a telecommunications network topology employing a linear programming method.

SUMMARY OF THE INVENTION

The present invention provides a system and method for optimally allocating multi-service traffic concentrators in telecommunications network by formulating a unique problem model in terms of mathematical expressions which represents the telecommunications network topology such that the model may be input to a linear programming algorithm for obtaining the most optimal allocation or layout of the network components. To conform to the rules of the linear programming, data set indices, decision variables, constraints and objective functions are selected and defined as parameters that represent the telecommunications network topology.

Data set indices are defined as those components and/or factors in the telecommunications network which affect various operations of the network, and include origination, concentration and destination sites as well as different multiplexer levels at each of the sites. Decision variables representing measures of efficiency in the network and whose optimal values are to be computed by the linear program are defined to include concentrator node selection, concentrator to destination site connection status, and the number of optical carrier trunks for each concentrator. The values for each of the three variables represent the equipment quantity for optimally allocating multi-service traffic concentrators.

The objective function to be minimized is defined as the sum of: the total transmission cost between selected origination sites and selected concentration sites; the total transmission cost between selected concentration sites and selected destination sites; the total unit cost of concentrators; the total port cost on the low side of the concentrators; and the total optical carrier level port cost on the high side of the concentrators and the destination switches. Thus, in setting up the objective function, the transmission costs, the unit costs of equipment, and the backbone switch ports are considered.

Further, the minimization of the objective function is computed subject to the unique constraints defined in the present invention. These constraints include conditions that one concentration site be assigned for any one origination site, that an origination site is enabled to be connected to a concentration site, and that there be a balance between the low and high side of the concentrators, i.e., the total capacity on low side must not exceed the capacity available on the high side of the concentrator. The latter constraint prevents any occurrence of a potential bottleneck at the concentrators.

In addition, a baseline network parameter which represents the cost of non-optimized network is determined by summing the transmission cost between origination and destination sites with the backbone switch port cost. This baseline network parameter is used as a baseline comparison to the optimized network cost.

The present invention provides the concentrator equipment facilities and their allocation arrangement in the network as the measure of that network's efficiency. Consequently, in the present invention, the concentrator related equipment is computed as decision variables in linear programming which would provide an optimal network topology with optimal number of traffic concentrators present.

Moreover, the present invention utilizes a relatively small number of variables and constraints such that the optimal values are computed quickly and efficiently by the linear program. Such quick and efficient calculations of linear programming provides a reduction in the cost of running the program, enabling modulation of the various parameters, variables and even the constraints, in search of the most optimally possible network with given traffic usage. Further yet, with the model built and automated, the model may easily be modified by changing one or more input variables for updating as well as for adapting the model to another similar network design.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DESCRIPTION OF THE PREFERRED EMBODIMENT

In accordance with the goals of the present invention, data sets or item sets with indices, decision variables, constraints, and objective functions are defined for building a model which represents a telecommunications network topology and which is to be applied as an input to a linear programming algorithm. A linear programming algorithm such as a simplex method may be employed for the purposes of the present invention. In the preferred embodiment of the present invention, data sets are defined either from a given data or by deriving data values from the given data.

Figure 1:
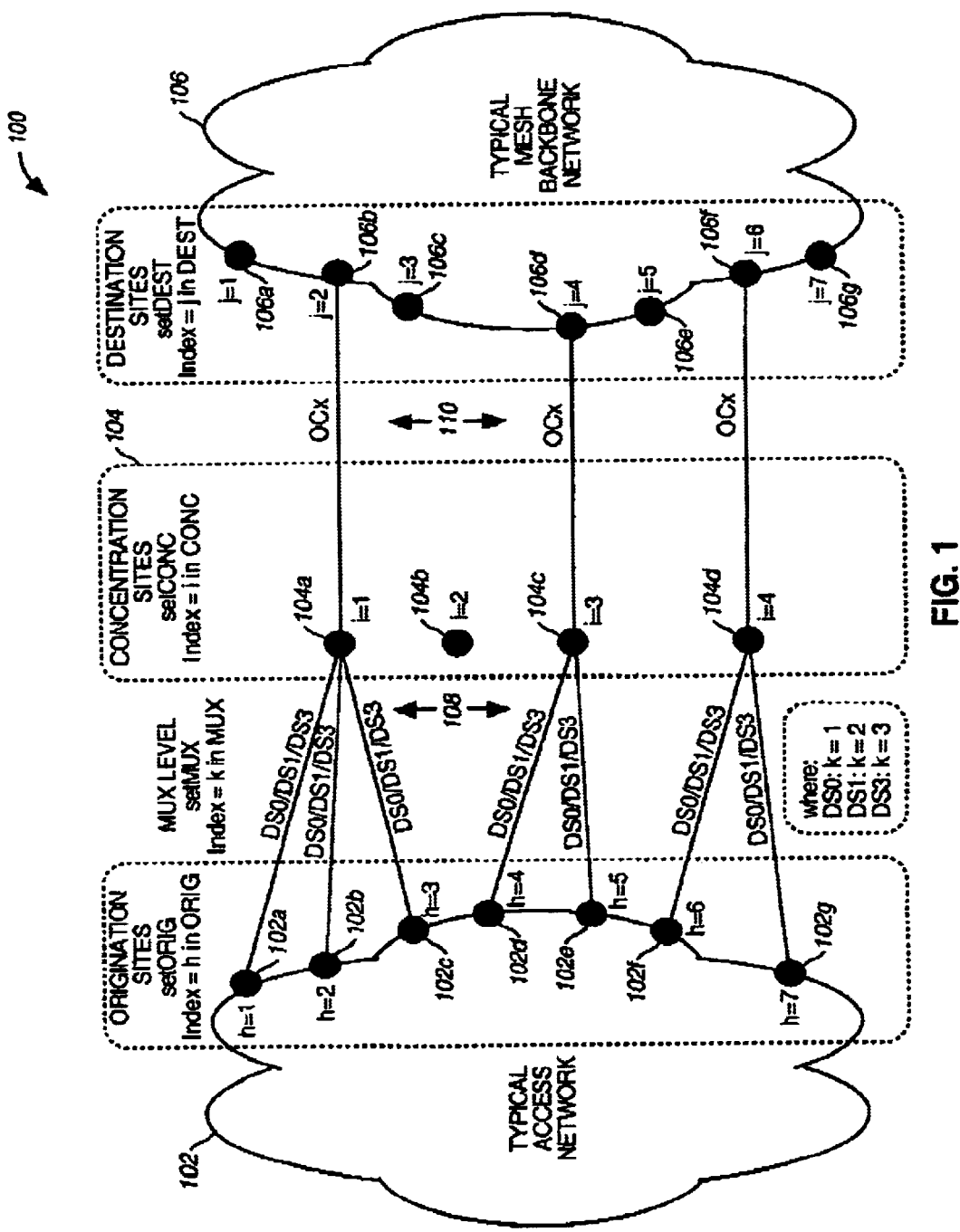
FIG. 1 illustrates an example of a network topology to be optimized in the preferred embodiment of the present invention.

FIG. 1 illustrates a typical network topology 100 to be optimized by the present invention. As shown, the network 100 generally includes a typical access network 102 comprising a number of origination sites 102a–102g communicating with a set of concentration sites 104a–104d. The concentration sites 104 are also connected to a typical mesh backbone network 106 comprising any number of destination sites 106a–106g. The mesh backbone network 106 generally ties together diverse networks over wide areas and handles internet work traffic. The origination sites 102a–102g may use different multiplexer levels 108 such as DS0, DS1, or DS3 for their communications with the concentration sites 104a–104d. The multiplexer levels 108 define channels for carrying digitized voice signals over twisted copper wire, for example. The concentration sites 104 may also employ an optical carrier (OC) level 110 for routing the data to the destination sites 106a–106g. OCs are the digital hierarchy of the SONET standard which define how digital signals are multiplexed on fiber-optic cables.

For the network topology shown in FIG. 1, the first four data sets include lists of site names and lists of multiplex data rate levels. The data sets defined and derived in the present invention are shown in Table 1. As shown in Table 1, the first data set ORIG includes a set of sites that originate traffic. These sites may include access sites and POPs (Point of Presence), a point at which the interexchange carriers connector are accessed. For example, a POP is the point where long-distance telephone service providers, i.e., interexchange carriers, connect into regional and local telephone systems. Presently, AT&T, MCI, Sprint, and many other carriers connect with POPs at regional facilities.

The second data set CONC includes a set of sites that concentrate traffic. These concentrator sites typically merge a number of incoming lines with a number of outgoing lines, and/or provide a central communication link. An example of a concentrator site includes the Multi Service Platform sites and may include ATM switches for providing data conversion into appropriate ATM cells for further transport. The third data set DEST includes a set of sites that terminate traffic. Such sites may include backbone sites which typically tie together diverse networks in the same building or organization. The fourth set MUX includes a set of multiplexer levels such as DS0, DS1, and DS3 hierarchy which define the level of digital streams. DS0, DS1, DS3 digital signal levels refer to the data rate and format of digital telecommunication circuits. For example, DS0 has a single channel for carrying a digitized voice signal. Sites from different sets may be in the same physical location. Each of the above defined data sets are assigned an index for expressing the set in mathematical terms. The following defines indices or the subscripts assigned in the present invention for the above defined four data sets:

h=sites originating traffic, {h ∈ ORIG};
i=sites that concentrate traffic, {i ∈ CONC};
j=sites that terminate traffic, {j ∈ DEST};
k=multiplexer levels such as DS0, DS1, DS3, {k ∈ MUX}.

The next set defined in Table 1 is "demand" and includes all the capacity demands per origination site per each multiplexer level. The next group of data sets include the distance between any two points in the network topology. That is, O_C_dist includes distances from all the origination sites to the concentration sites. Similarly, C_D_dist includes distances from all the concentration sites to the destination sites. Likewise, O_D_dist includes distances from all the origination sites to the destination sites. The distance values are all set to be greater than or equal to zero to represent positive distance values.

In the preferred embodiment of the present invention, the next two data sets are derived from the above defined data sets. The first derived set, C_dist, includes the set of minimum distances from selected concentration sites to the nearest destination site associated with the selected concentration site. The second derived set, O_dist, includes the set of minimum distances between selected origination sites and the nearest destination site associated with the selected origination site.

TABLE 1

| Set ORIG | set of sites that originate traffic (e.g., access sites, POPs) |
|---|---|
| Set CONC | set of sites that concentrate traffic (e.g., Multi Service Platforms sites) |
| Set DEST | set of sites that terminate traffic (e.g., backbone sites) |
| Set MUX | set of multiplexer levels (e.g., DS0, DS1, DS3) |
| param demand {MUX,ORIG} >=0 | total demand for a given origination site and mutiplexer level |
| param O_C_dist{ORIG,CONC}>=0 | distance between origination and concentration sites |
| param O_C_dist{CONC,DEST}>=0 | distance between concentration and zdestination sites |
| param O_D_DIST{ORIG,DEST}>=0 | distance between origination and destination sites |
| param C_dist{i in CONC} := min{j in DEST} C_D_dist[i,j] | set minimum distance from selected concentration sites to a nearest destination site associated with the selected concentration sites |
| param O_dist{h in ORIG} := min{j in DEST} O_D_dist[h,j] | set of minimum distances between selected origination sites and the nearest destination site associated with the origination sites |

Figure 2:
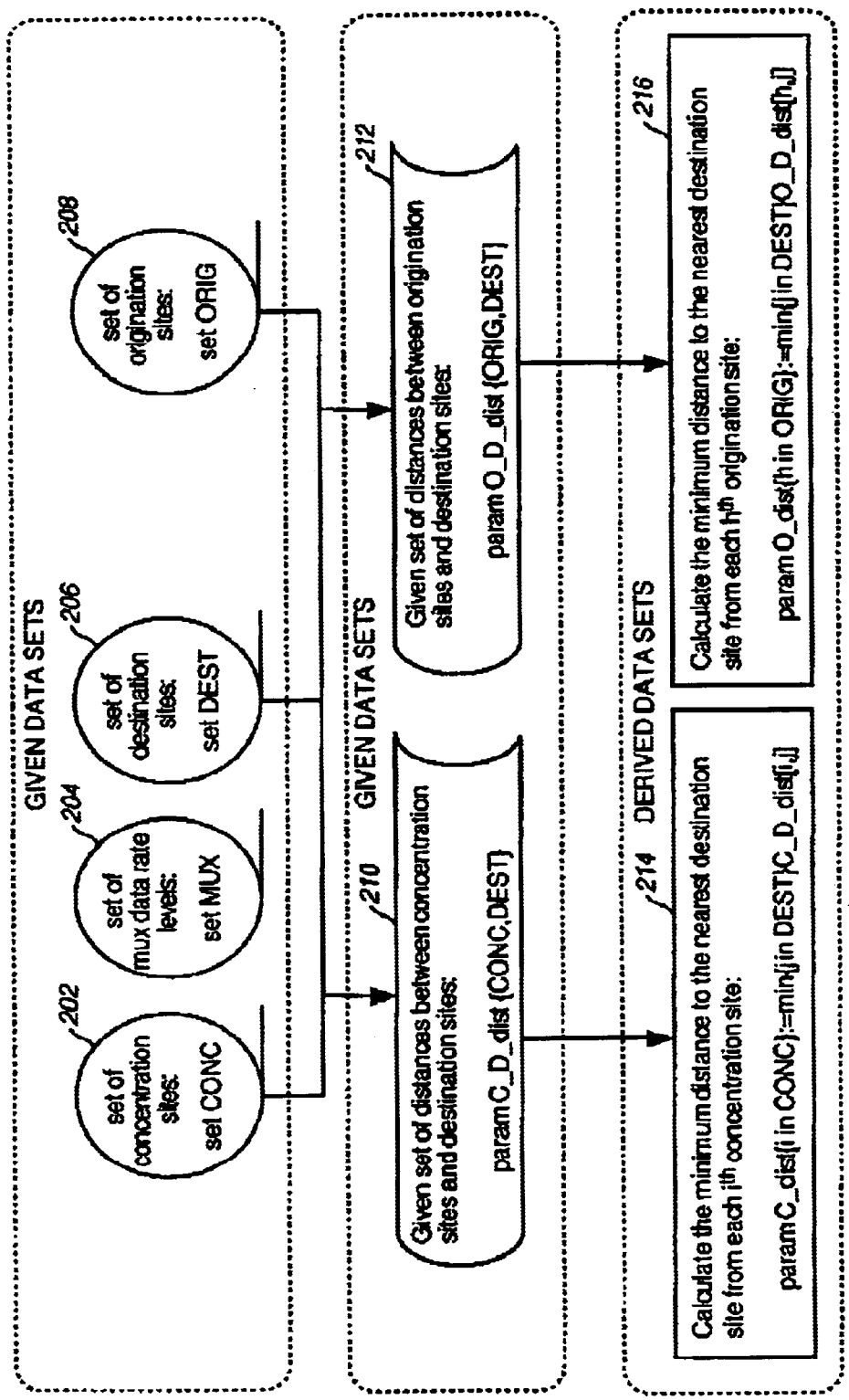
FIG. 2 is a block diagram summarizing the data set development of the present invention for computation of optimized network topology.

FIG. 2 is a flow diagram summarizing the data set development of the present invention for computation of optimized network topology. Data including concentration sites 202, multiplexer level 204, destination sites 206 and origination sites 208 are defined into their respective data sets CONC, MUX, DEST, and ORIG. Additionally, two additional sets C_D_dist and O_D_dist are defined and assigned to include distance data between the nodes in the network topology. Particularly, at 210 C_D_dist is set to include the distance values between the concentration sites and the destination sites. Similarly, at 212, O_D_dist is set to include the distance values between the origination sites and the destination sites. Then, additional data sets, C_dist and O_dist, employed in the present invention are derived and assigned from the values of the defined data sets given above. That is, at 214 a set of values for C_dist is derived by selecting from C_D_dist the minimum distance to the nearest destination site from each $j^{th}$ concentrator site. Likewise, a set of values for O_dist is derived at 216 from O_D_dist by determining the minimum distance to the nearest destination site from each $h^{th}$ origination site.

In addition to the above given and derived data values, the present invention employs parameters as set forth in Table 2. The values for these parameters are either given or derived from the given data and include, transmission cost per mile for a given multiplexer (mux) level, transmission cost per mile of optical carrier level, OCx, unit cost for a concentrator, port cost for each concentrator for a given mutiplexer level, port cost for each concentrator for a given OCx port, port cost at a destination switch for a given mutiplexer level, and OCx port cost at a destination switch. The values for the foregoing data are set to greater than zero and each represent a factor to be considered for optimizing cost in the telecommunications network topology. Thus, the values are used in defining the constraints and the objective function to be optimized.

TABLE 2

| param tr_cost{MUX} >= 0 | transmission cost/mile for a given multiplexer level |
|---|---|
| param tr_cost_OCx >= 0 | transmission cost/mile of OCx on the high side |
| param unit_cost_c >= 0 | Concentrator unit cost |
| param port_cost_c{MUX} >= 0 | concentrator port cost for a given multiplexer level |
| param port_cost_c_OCx >= 0 | OCx port cost at concentrator |
| param port_cost_d{MUX} >= 0 | port cost at destination switch for a given multiplexer level |
| param port_cost_d_OCx >= 0 | OCx port cost at destination switch |

The next parameter shown in Table 3 and included in the preferred embodiment of the present invention is the OCx function parameters which define the optical mutiplexer level as the number of DS-3 circuits provisioned between a given concentration node and a given destination node.

TABLE 3

| param OCx > 0, integer | number of DS3s after concentration, e.g., this parameter would have a value of 12 when there is an OC12 capacity between concentration and destination |
|---|---|

Additional two parameters provided by the present invention and shown in Table 4, include the number of DS0s per mutiplexer level, e.g., DS0s per DS1, DS0s per DS3, DS0s per OCx, etc.

TABLE 4

| param mux_ratio{MUX} > 0, integer | on the low side of the concentrator |
|---|---|
| param mux_ratio_OCx = OCx*24*28 | on the high side of the concentrator |

The next given function shown in Table 5, specifies the ratio of capacity per multiplexer level on the low side of a concentrator to the capacity per multiplexer level on the high side of the concentrator. This ratio represents the efficiency per multiplxer level of using the concentrator.

TABLE 5

| param compression{MUX} > 0 | over-subscription rate |
|---|---|

The functions specified in Table 6 represent the preferred decision variables of the present invention, the values for which the linear program computes during the program execution. As explained above, in linear programming, the decision variables define the quantities which measure efficiency in a given situation and which are desirable to minimize or maximize. In the preferred embodiment of the present invention, the variables provided in Table 6 are the quantities that measure the efficiency of the network topology example and represent the optimal values which may be used in building the given network topology for the most efficient communication of data among the nodes.

The first variable C_select defines a binary on/off switch that determines selection of which concentrator nodes should be employed in the optimized network. The second variable O_C_asgn also has a binary value and defines a state indicating whether or not a given origination site is connected to a given concentration site. The third variable $n_{13}$ OCx defines the number of OCx trunks for each concentrator.

TABLE 6

| var C_select{CONC} binary | is either 1 or 0, to denote whether or not the concentrator is used |
|---|---|
| var O_C_asgn{ORIG,CONC} binary | is either 1 or 0, to denote whether or not a given origination site is connected to a given concentration site |
| var n_OCx{CONC} >= 0, integer | number of OCx trunks for each concentrator |

In the present invention, an additional parameter is input to the linear program which represents the cost of the network without concentrators, i.e., the cost of a baseline or a non-optimized network. The cost parameter is calculated from several parameter functions described herein and is used as a baseline comparison to the optimized network cost. This cost parameter shown as an equation in Table 7, incorporates transmission costs between origination and destination sites and also the cost of the backbone switch port.

TABLE 7

| param cost_wo_conc := sum {h in ORIG, k in MUX} demand[k,h]*tr_cost[k]*O_dist[h] + demand[k,h]*port_cost_d[k] |
|---|

Figure 3:
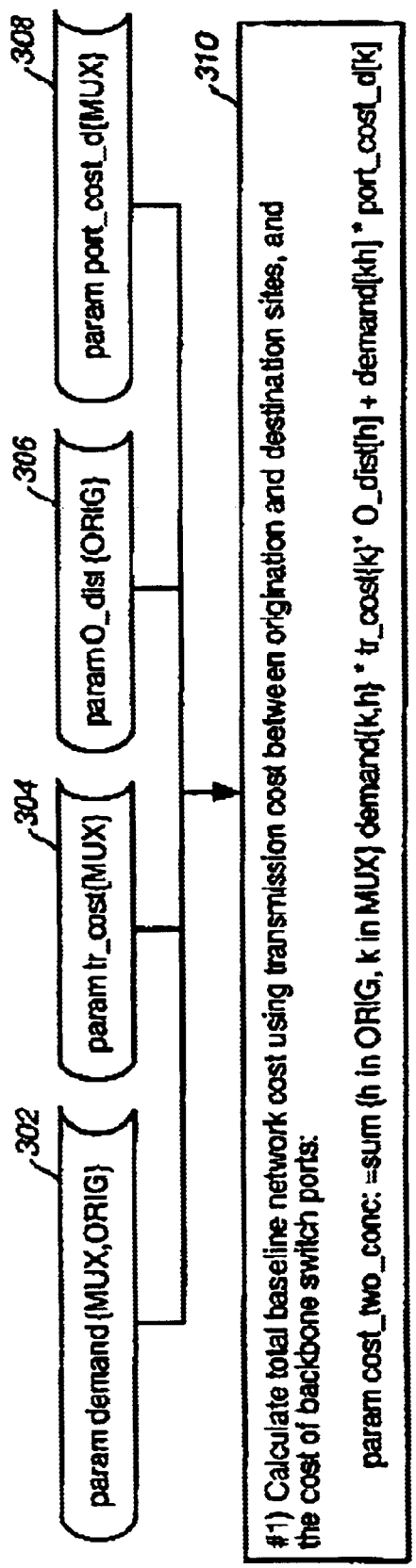
FIG. 3 illustrates a block diagram for determining the cost of non-optimized baseline network.

FIG. 3 illustrates a flow diagram for determining the cost of a non-optimized baseline network. As described above, four data parameters are employed to compute the cost of the baseline network in the preferred embodiment of the present invention. Demand parameter 302 represents a capacity demand at each origination site for each multiplexer level. Tr_cost 304 parameter defines the transmission cost per mile for a given multiplexer level, i.e., DS0, DS1, and DS3. O_dist parameter 306 represents the minimum distance between a selected origination site to the nearest destination site associated with the origination site. The fourth parameter, port_cost_d 308 defines the port cost at a destination switch for a given multiplexer level. These four parameters 302, 304, 306, 308 are combined as shown at 310 to compute the total cost of a network without optimization.

As shown in FIG. 3, the total cost takes into account the transmission cost between origination and destination sites and the cost of backbone switch ports.

To minimize the total cost for an optimized network topology, a sequence of summations defined in the present invention are computed. Table 8 shows the first summation component which represents the total transmission cost between a selected origination site and selected concentrators.

TABLE 8

| sum {h in ORIG, i in CONC, k in MUX} demand[k,h]*tr_cost[k]*O_C_dist[h,j]*O_C_asgn[h,j] |
|---|

The second summation component shown in Table 9 represents the total transmission cost between selected concentrators and selected destinations.

TABLE 9

| sum {i in CONC} tr_cost_OCx*C_dist[i]*n_Ocx[i] |
|---|

The third summation component shown in Table 10 represent the total unit cost of concentrators.

TABLE 10

| sum {i in CONC} unit_cost_c*C_select[i] |
|---|

The fourth summation component shown in Table 11 represents the total port cost on the low side of concentrators.

TABLE 11

| sum {h in ORIG, k in MUX} demand[k,h]*port_cost[k] |
|---|

The fifth summation component shown in Table 12 is the total OCx port cost on high side of concentrators and destination switches.

TABLE 12

| sum {i in CONC} (port_cost_c_OCx + port_cost_d_OCx)*n_Ocx[i] |
|---|

Thus, in the preferred embodiment, the total sum of each of the summations shown in Tables 8–12 forms an objective function to be input to the linear program for optimization. That is, the total cost of the network which is represented by the total sum of the sequences of the above summation is the cost to be optimized, more specifically, minimized by a linear programming method. Thus, according to the present invention, the optimization considers transmission costs between the origination and concentration sites and the concentration and the destination sites, unit cost of each concentrator, port cost of each concentrator on both the low and the high sides, and the backbone switch ports.

Figure 4:
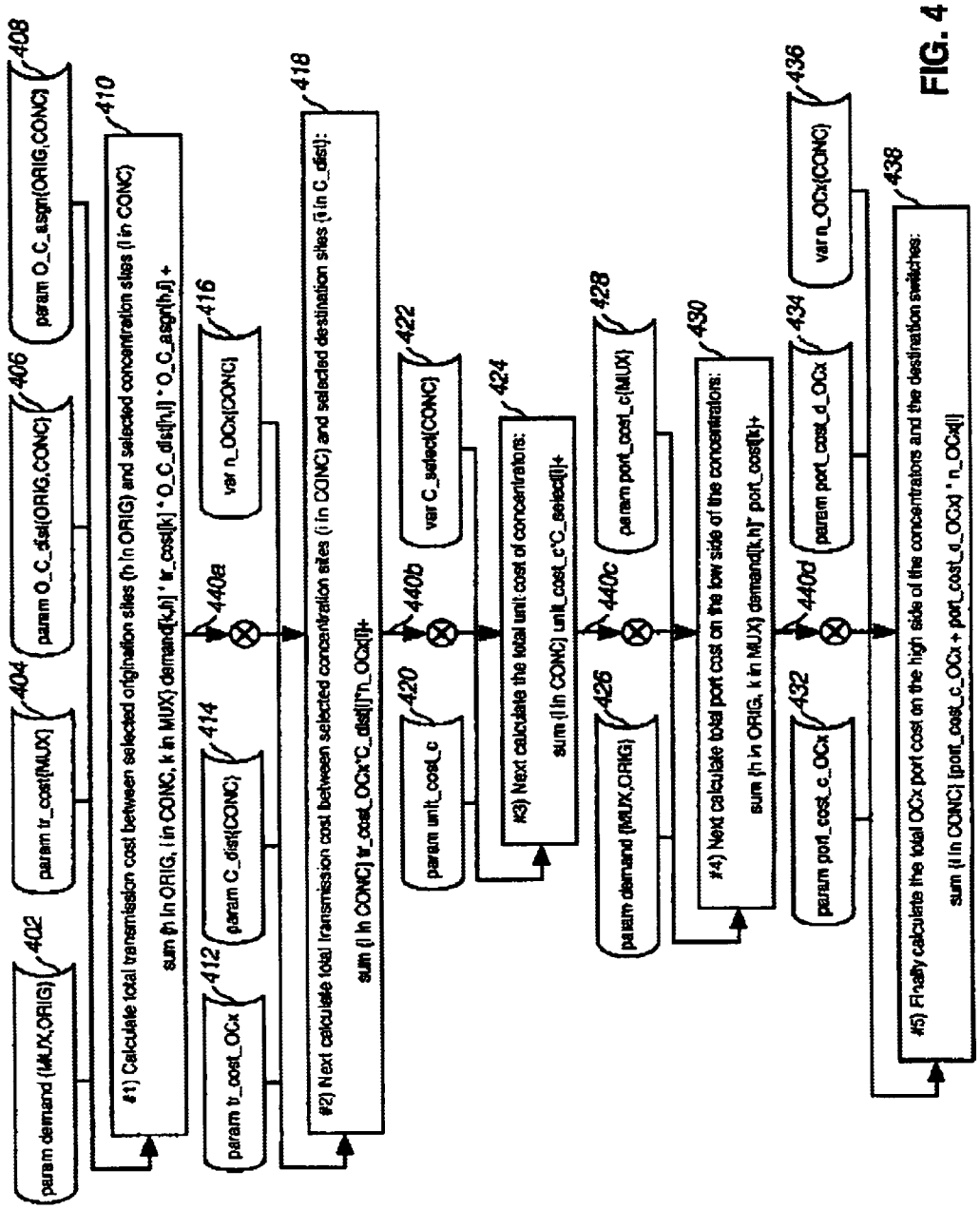
FIG. 4 illustrates a block diagram for determining the objective function to be minimized.

FIG. 4 illustrates a block diagram for determining the objective function to be minimized as described above. Parameters demand 402, tr_cost 404, O_C_dist 406, and variable O_C_asgn 408 are employed as an input to the first summation component of the objective function. This first summation component computed at 410 defines a total transmission cost between selected origination sites {h in ORIG} and selected concentration sites {i in CONC}.

The second summation component is computed at 418 with the input values of parameter tr_cost_OCx 412, C_dist 414, and variable $n_{13}$ OCx 416. The second summation defines the total transmission cost between selected concentration sites {i in CONC} and selected destination sites {i in C_dist}.

The third summation component is calculated at 424 with the input values of parameter unit_cost_c 420 and variable C_select 422. Unit_cost_c was described above as the cost of each concentrator, and C_select was described as representing the binary on/off switch for selecting which concentrators are employed in the optimized network. These values are input to determine the third sum at 424 which represents the total unit cost of concentrators.

The fourth sum computed at 430 represents the total port cost on the low side of the concentrators. This sum is obtained by combining the values of demand 426 and port_cost_c 428 parameters. Port_cost_c 428 represents port cost for concentrators for a given multiplexer level.

The fifth sum determined at 438 represents the total optical carrier (OCx) port cost on the high side of the concentrators and the destination switches. The fifth sum is computed by combining the values port_cost_c_OCX 432 which is defined as the OCx port costs at concentrator sites, prot_cost_d_OCx 434 which is defined as the destination switches, and variable $n_{13}$ OCx which is defined as the number of OCx trunks for each concentrators. As shown by the thick arrows at 440*a–d*, the first to fifth summation values are all combined together to determine the total cost of running the network topology as shown in FIG. 1. This total cost then defines the objective function for optimization.

In the preferred embodiment of the present invention, the following three constraints on linear programming methods are set as the required conditions which must be met when minimizing the above described summation of the total cost. The first constraint requires that one concentration site be assigned per origination site, i.e., {h in ORIG}. The expression of first constraint is shown in Table 13.

TABLE 13

| sum {i in CONC} O_C_asgn[h,i] = 1 |
|---|

The second constraint requires that an origination site selected can be connected to a selected concentration site. This constraint is expressed in Table 14.

TABLE 14

| for {i in CONC}, sum {h in ORIG} O_C_asgn[h,i] <= card(ORIG)*C_select[i] |
|---|

The third constraint requires that the capacity balance between the low and high sides of the concentrator are subject to low_high_capacity for all {i in CONC}. Table 15 shows the expression for this constraint.

TABLE 15

| sum {h in ORIG, k in MUX} O_C_asgn[h,j]*demand[k,h]*mux_ratio[k]/compression[k] <= n_OCx[i]*mux_ratio_OCx |
|---|

Figure 5:
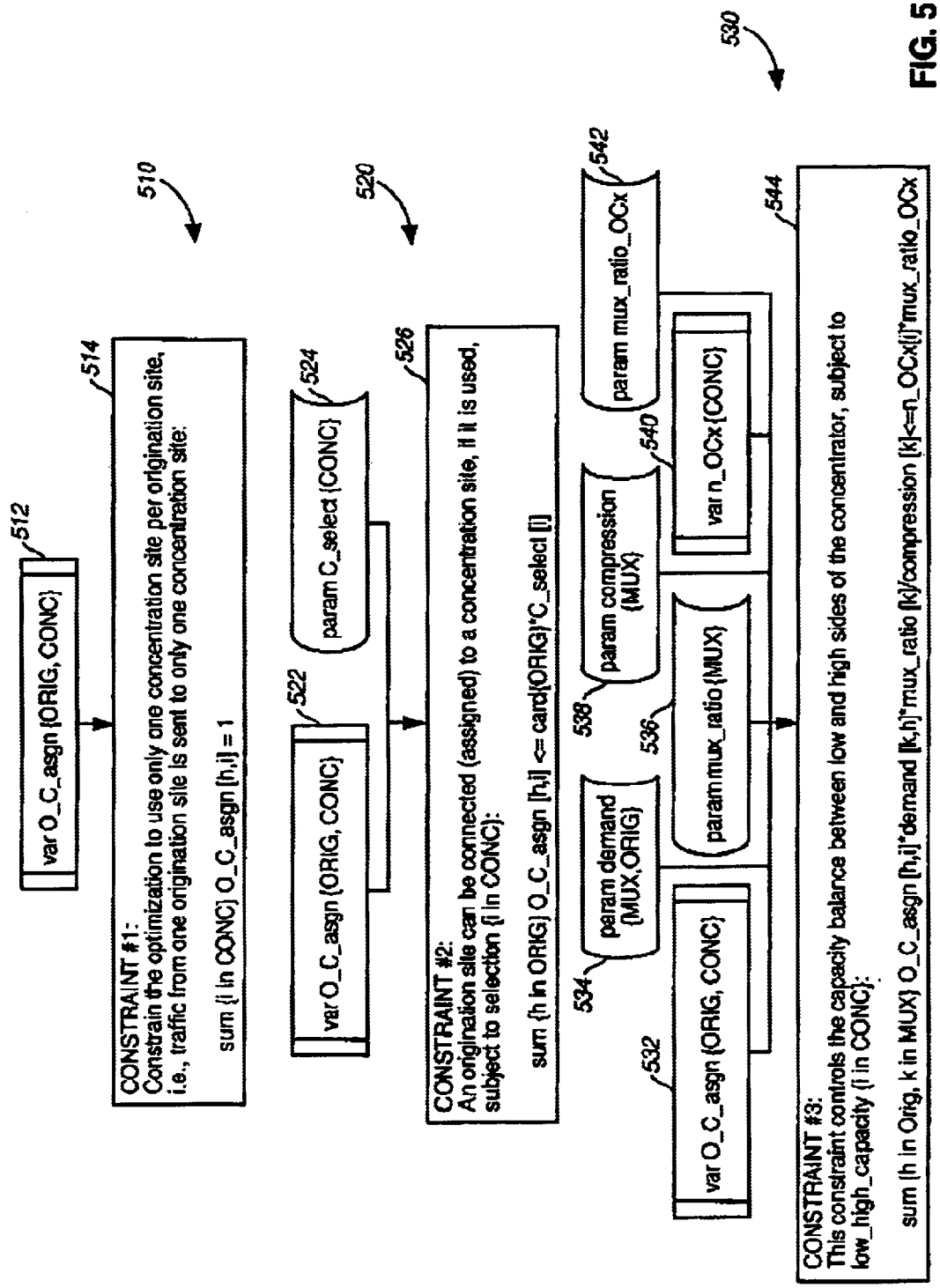
FIG. 5 illustrates a block diagram for determining the constraints under which the optimization is performed.

FIG. 5 illustrates a block diagram for determining the constraints on the computation of optimized network topology. At 512, the variable O_C_asgn which represents an existence of a connection between an origination site and a concentrator is employed to define and supply a constraint on the objective function. Accordingly, a first constraint 510 that only one concentration site be connected from any one origination site is set at 514. As an example of this constraint, any traffic from one origination site is sent to only one concentration site.

The second constraint in the preferred embodiment of the present invention is shown at 520 and includes variable O_C_asgn 522 and parameter C_select 524. As described herein, C_select parameter 524 has a set of binary values which are representative of those concentrator nodes in use by the optimized network. As shown at 526, these two values are employed to set a second constraint under which the optimization computation must be performed. This second constraint specifies that an origination site may be connected or assigned to a concentration site in use subject to selection of the concentration site.

The third constraint in the preferred embodiment of the present invention is shown at 530 and includes parameter values demand 534, compression 538, mux_ratio_536, and mux_ratio_OCx 542, and variables O_C_asgn 532 and $n_{13}$ OCx 540. Demand parameter 534 includes a set of values representing a capacity demand of a multiplexer associated with an origination site. Mux_ratio 536 and mux_ratio_OCx 542 parameters include a number of DS0s per multiplexer level. Compression parameter 538 includes a set of values representing the ratio of capacity demand for the multiplexer level between the origination and concentrator, and capacity demand for the multiplexer level between the concentrator and destination site. This ratio generally represents the efficiency of using the concentrator at each multiplexer level. Variable $n_{13}$ OCx represent the number of trunks for each concentrator. As shown at 544, these values are employed to set a third constraint supplied to the optimization method. The third constraint controls the capacity balance between low and high sides of the concentrator, subject to low_high_capacity.

Now that a preferred embodiment of the present invention has been described with alternatives, various modifications and improvements will occur to those of skill in the art without departing from the spirit and scope of the invention. For instance, the decision variables, data item sets, and the objective functions may be modulated and varied in order to test and determine the optimal network desired. Thus, the detailed description should be understood as an example and not as a limitation. The proper scope of the invention is properly defined by the appended claims.

What is claimed is:

1. A method for optimally allocating traffic concentration sites in a telecommunications network having one or more origination sites, concentration sites, and destination sites, and including multiplexer levels employed for connecting one or more origination and concentration sites, the method comprising:

determining a minimization objective by computing a total cost related to a telecommunications network;

defining decision variables related to the telecommunications network; and setting constraints related to the telecommunications network for defining boundaries in optimizing the telecommunications network, the constraints including a first condition that one concentration site be connected to one origination site, a second condition that the origination site be connected to an active concentration site, and a third condition that a capacity balance between a low and high side of the concentration sites be maintained, wherein the minimization objective, the decision variables, and the constraints are applied to a linear programming algorithm for generating decision variable values for optimizing the telecommunications network.

2. The method for optimally allocating traffic concentration sites in a telecommunications network as claimed in claim 1, wherein the step of determining a minimization objective includes:

determining a total transmission cost between selected origination sites and selected concentration sites.

3. The method for optimally allocating traffic concentration sites in a telecommunications network as claimed in claim 1, wherein the step of determining a minimization objective includes:

determining a total transmission cost between selected origination sites and selected concentration sites;

determining a total transmission cost between selected concentration sites and selected destination sites; and determining a summation of the determined total transmission cost between selected origination sites and selected concentration sites and the total transmission cost between selected concentration sites and selected destination sites.

4. The method for optimally allocating traffic concentration sites in a telecommunications network as claimed in claim 1, wherein the step of determining a minimization objective includes:

determining a total transmission cost between selected origination sites and selected concentration sites;

determining a total transmission cost between selected concentration sites and selected destination sites;

determining a total unit cost of concentration sites; and determining a summation of the determined total transmission cost between selected origination sites and selected concentration sites, the total transmission cost between selected concentration sites and selected destination sites, and the total unit cost of the concentration sites.

5. The method for optimally allocating traffic concentration sites in a telecommunications network as claimed in claim 1, wherein the step of determining a minimization objective includes:

determining a total transmission cost between selected origination sites and selected concentration sites;

determining a total transmission cost between selected concentration sites and selected destination sites;

determining a total unit cost of concentration sites;

determining a total port cost on low sides of said concentration sites; and determining a summation of the determined total transmission cost between selected origination sites and selected concentration sites, the total transmission cost between selected concentration sites and selected destination sites, the total unit cost of the concentration sites, and the total port cost on low sides of the concentration sites.

6. The method for optimally allocating traffic concentration sites in a telecommunications network as claimed in claim 1, wherein the step of determining a minimization objective includes:

determining a total transmission cost between selected origination sites and selected concentration sites;

determining a total transmission cost between selected concentration sites and selected destination sites;

determining a total unit cost of concentration sites;

determining a total port cost on low sides of said concentration sites;

determining a total port cost on high sides of said concentration sites;

determining a summation of the determined total transmission cost between selected origination sites and selected concentration sites, the total transmission cost between selected concentration sites and selected destination sites, the total unit cost of the concentration sites, the total port cost on low sides of the concentration sites, and the total port cost on high sides of the concentration sites.

7. The method for optimally allocating traffic concentration sites in a telecommunications network as claimed in claim 1, wherein the step of determining a minimization objective includes:

determining a total transmission cost between selected origination sites and selected concentration sites;

determining a total transmission cost between selected concentration sites and selected destination sites;

determining a total unit cost of concentration sites;

determining a total port cost on low sides of said concentration sites;

determining a total port cost on high sides of said concentration sites;

determining a total switch port cost of said destination sites; and determining a summation of the determined total transmission cost between selected origination sites and selected concentration sites, the total transmission cost between selected concentration sites and selected destination sites, the total unit cost of the concentration sites, the total port cost on low sides of the concentration sites, the total port cost on high sides of the concentration sites, and the total switch port cost of the destination sites.

8. The method for optimally allocating traffic concentration sites in a telecommunications network as claimed in claim 1, wherein the step of defining decision variables includes:

defining a set of first switches designating whether or not a concentration site is employed in the telecommunications network.

9. The method for optimally allocating traffic concentration sites in a telecommunications network as claimed in claim 8, wherein the step of defining decision variables further includes:

defining a set of second switches designating whether or not an origination site is connected to a concentration site.

10. The method for optimally allocating traffic concentration sites in a telecommunications network as claimed in claim 9, wherein the step of defining decision variables further includes:

defining a set of trunk variable representing a number of trunk connections between each of the concentrator sites and the destination sites.

11. The method as claimed in claim 1, wherein the method further includes defining a baseline network representing a non-optimized telecommunications network and its related cost, wherein the baseline network cost is compared with the optimized network.

12. The method as claimed in claim 11, wherein the step of defining a baseline network includes determining a summation value representing transmission cost between one or more origination and destination sites and a switch port cost.

13. The method as claimed in claim 1, wherein the telecommunications network includes one or more point of presence (POPs) as one or more origination sites.

14. The method as claimed in claim 1, wherein the telecommunications networks includes one or more access sites as one or more origination sites.

15. The method as claimed in claim 1, wherein the telecommunications network includes one or more ATM switches as one or more concentration sites.

16. The method as claimed in claim 1, wherein the telecommunications network includes one or more backbone sites as one or more destination sites.

17. The method as claimed in claim 1, wherein the telecommunications network includes assigning digital hierarchy levels which define channels for carrying digitized voice signals over a transport medium as one or more multiplexer levels.

18. The method as claimed in claim 17, wherein the digital hierarchy level includes DS0.

19. The method as claimed in claim 17, wherein the digital hierarchy level includes DS1.

20. The method as claimed in claim 17, wherein the digital hierarchy level includes DS3.

21. The method as claimed in claim 1, wherein the telecommunications network includes one or more trunks connecting one or more concentrator sites and one or more destination sites, the trunks supporting the digital hierarchy of the SONET standard.

22. The method as claimed in claim 2, wherein the step of determining a total transmission cost between selected sites and selected concentration sites comprises:

determining a summation of products of a capacity demands for each multiplexer level at each origination site, a transmission cost per mile for a multiplexer level, and a distance between each origination site and concentration site to which said each origination site has connections established.

23. The method as claimed in claim 3, wherein the step of determining a total transmission cost between selected concentration sites and selected destination sites includes:

determining a summation of products of a transmission cost per mile of connections employed between one or more concentration sites and one or more destination sites, a minimum distance from a selected concentration site to a nearest destination site associated with the selected concentration site.

24. The method as claimed in claim 4, wherein the step of determining a total unit cost of concentration sites includes determining a summation of unit cost for each selected concentration site.

25. The method as claimed in claim 5, wherein the step of determining a total port cost on low sides of said concentration sites includes determining a summation of products of capacity demands for each multiplexer level at each origination site and a port cost associated with said each multiplexer level.

26. The method as claimed in claim 6, wherein the step of determining a total port cost on high sides of said concentration sites includes determining a summation of products of port cost related to each concentration site in the telecommunications network and a number of connections established from said each concentration site to one or more destination sites.

27. The method as claimed in claim 7, wherein the step of determining a total switch port cost of said destination sites includes determining a summation of products of switch port costs and a number of connections established from said each concentration site to one or more destination sites.

28. A program storage device readable by machine, tangibly embodying a program of instructions executable by the machine to perform method steps for optimally allocating traffic concentration sites in a telecommunications network having one or more origination sites, concentration sites, and destination sites, and including multiplexer levels employed for connecting one or more origination and concentration sites, the method steps comprising:

determining a minimization objective by computing a total cost related to a telecommunications network;

defining decision variables related to the telecommunications network; and setting constraints related to the telecommunications network for defining boundaries in optimizing the telecommunications network, the constraints including a first condition that one origination site be connected to one concentration site, a second condition that the origination site be connected to an active concentration site, and a third condition that a capacity balance between a low and high side of the concentration sites be maintained, wherein the minimization objective, the decision variables, and the constraints are applied to a linear programming algorithm for generating decision variable values for optimizing the telecommunications network.

* * * * *